(12) United States Patent
Underwood et al.

(10) Patent No.: US 9,297,599 B2
(45) Date of Patent: Mar. 29, 2016

(54) POLYMER/COMPOSITE FIREARMS AND A PROCESS FOR STRENGTHENING POLYMER/COMPOSITE FIREARMS

(71) Applicant: MEAN L.L.C., Woodstock, GA (US)

(72) Inventors: James Matthew Underwood, Woodstock, GA (US); Larry Cullen Underwood, Woodstock, GA (US)

(73) Assignee: MEAN L.L.C., Woodstock, GA (US)

( * ) Notice: Subject to any disclaimer, the term of this patent is extended or adjusted under 35 U.S.C. 154(b) by 1 day.

(21) Appl. No.: 13/971,681

(22) Filed: Aug. 20, 2013

(65) Prior Publication Data

US 2015/0052794 A1    Feb. 26, 2015

(51) Int. Cl.
*F41A 3/66* (2006.01)
*B29K 79/00* (2006.01)
*B29K 105/06* (2006.01)
*B29K 705/00* (2006.01)
*B29L 31/00* (2006.01)

(52) U.S. Cl.
CPC ............. *F41A 3/66* (2013.01); *B29K 2079/085* (2013.01); *B29K 2105/06* (2013.01); *B29K 2705/00* (2013.01); *B29L 2031/777* (2013.01)

(58) Field of Classification Search
CPC ......................................................... F41A 3/66
See application file for complete search history.

(56) References Cited

U.S. PATENT DOCUMENTS

| 5,632,108 | A | 5/1997 | Ruger et al. |
| 6,070,354 | A | 6/2000 | Burigana et al. |
| 7,814,695 | B1 | 10/2010 | Keeney et al. |
| 8,789,305 | B1 * | 7/2014 | DiChario ...................... 42/75.03 |
| 2006/0283067 | A1 * | 12/2006 | Herring ...................... F41A 3/66 |
| | | | 42/75.01 |
| 2014/0230297 | A1 * | 8/2014 | Larson, Jr. .............. F41A 17/38 |
| | | | 42/6 |
| 2015/0000171 | A1 * | 1/2015 | Roberts ...................... F41A 3/66 |
| | | | 42/75.03 |

* cited by examiner

*Primary Examiner* — Reginald Tillman, Jr.
(74) *Attorney, Agent, or Firm* — Kilpatrick Townsend & Stockton LLP; Davidson G. Lucas

(57) ABSTRACT

A strengthened firearm includes at least one metal/composite material formed into at least one firearm component, and a polymer/composite material combined with the at least one firearm component. The metal/composite material replaces the polymer/composite material in a specific area or component of the firearm that may be weak or tend to fail earlier than other areas or components of a polymer/composite firearm. The method of combining the multiple materials allows for additional strength in the firearm.

15 Claims, 4 Drawing Sheets

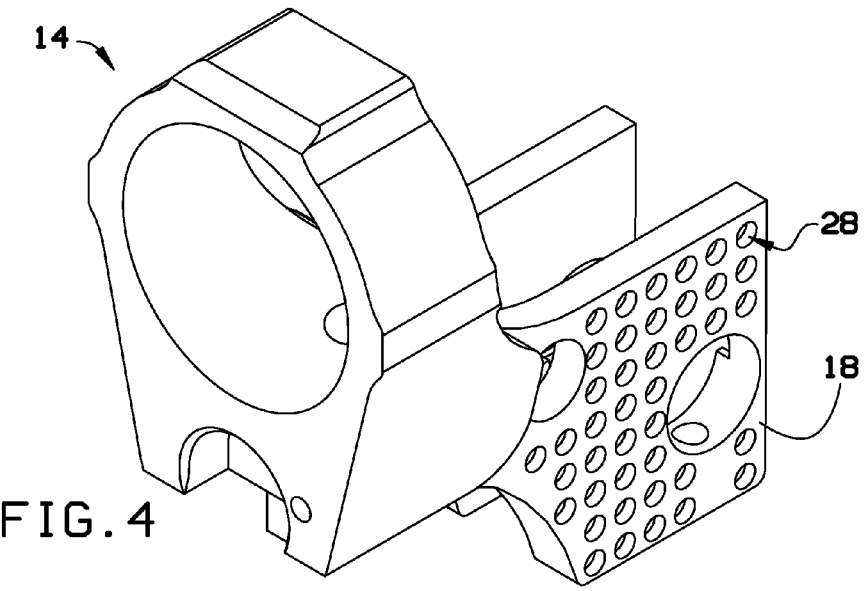
FIG.4
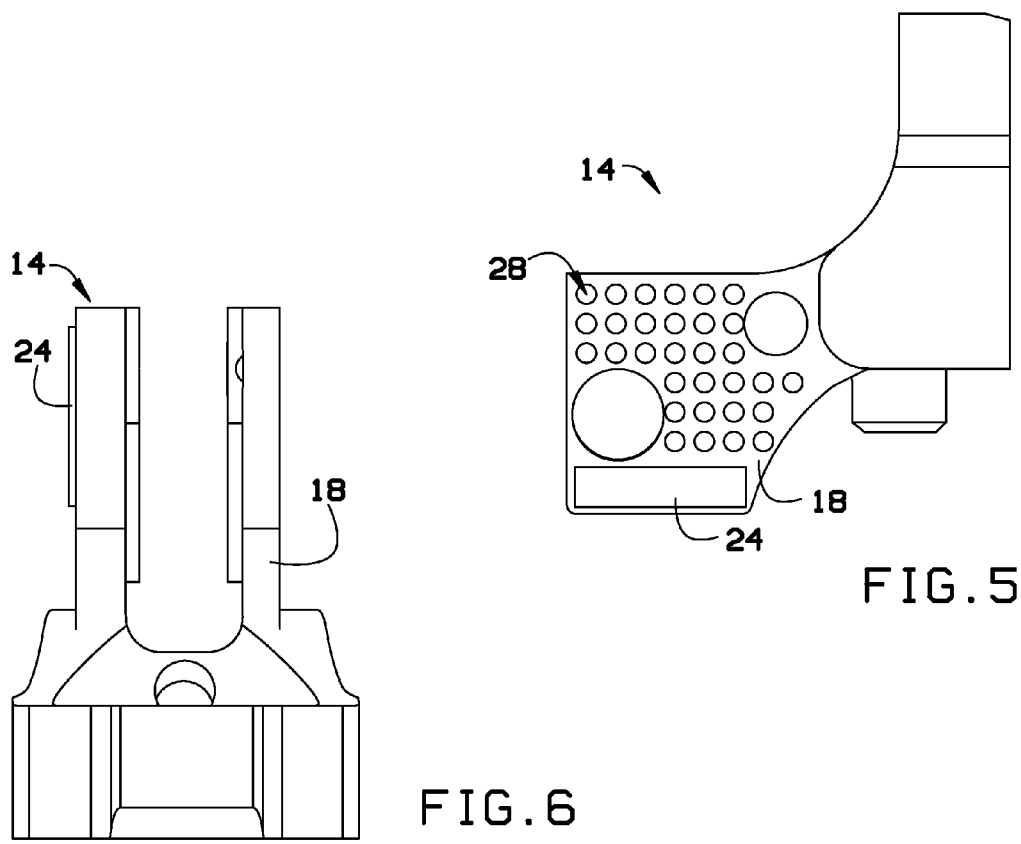
FIG.6
FIG.5

POLYMER/COMPOSITE FIREARMS AND A PROCESS FOR STRENGTHENING POLYMER/COMPOSITE FIREARMS

BACKGROUND OF THE INVENTION

The present invention relates to firearms and, more particularly, to strengthened polymer/composite firearms and methods for strengthening the same.

Polymer/composite firearms are used because they cost less and are light weight. Currently, there are weak or commonly known failure areas in polymer/composite firearms and firearms components. The components are not durable and sacrifice strength and the ability to withstand the extreme pressures and stresses created upon firing a round of ammunition in exchange for the lighter weight.

As can be seen, there is a need for a process that strengthens polymer/composite firearms in areas that are weak or commonly fail without losing the positive properties of a polymer/composite firearm.

SUMMARY OF THE INVENTION

In one aspect of the present invention, a strengthened firearm comprises at least one metal/composite material formed into at least one firearm component; and a polymer/composite material combined with the at least one firearm component.

In another aspect of the present invention, a method for strengthening polymer/composite firearms comprises forming at least one metal/composite material to a desired shape of at least one firearm component; inserting the at least one metal/composite material in a polymer/composite firearm mold; and combining the at least one metal/composite material and a polymer/composite material into a strengthened firearm.

These and other features, aspects and advantages of the present invention will become better understood with reference to the following drawings, description and claims.

BRIEF DESCRIPTION OF THE DRAWINGS

FIG. 4 is a perspective view of a stock buffer tube mount of an exemplary embodiment of the present invention;

FIG. 5 is a side view of the stock buffer tube mount of an exemplary embodiment of the present invention;

FIG. 6 is a top view of the stock buffer tube mount of an exemplary embodiment of the present invention;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a strengthened firearm and method. The strengthened firearm may include at least one metal/composite material formed into at least one firearm component, and a polymer/composite material combined with the at least one firearm component. The metal/composite material replaces the polymer/composite material in a specific area of the firearm that may be weak or tend to fail earlier than other areas of a polymer/composite firearm. The method of combining the multiple materials allows for additional strength in the firearm.

In composite/polymer firearms there are multiple areas or components that tend to fail earlier than other areas. The polymer used for molding may be a glass, Kevlar or carbon fiber filled nylon, glass, Kevlar or carbon fiber filled polyetherimide. The body may be molded out of any number of plastics that give the desired performance characteristics whether filled or unfilled. A process to strengthen these areas or components may increase the life span of the firearm. The process for strengthening polymer/composite firearms as herein described refers to specific components of a firearm. However, other components may be designed in a similar manner within the scope of the present invention.

Figure 1:
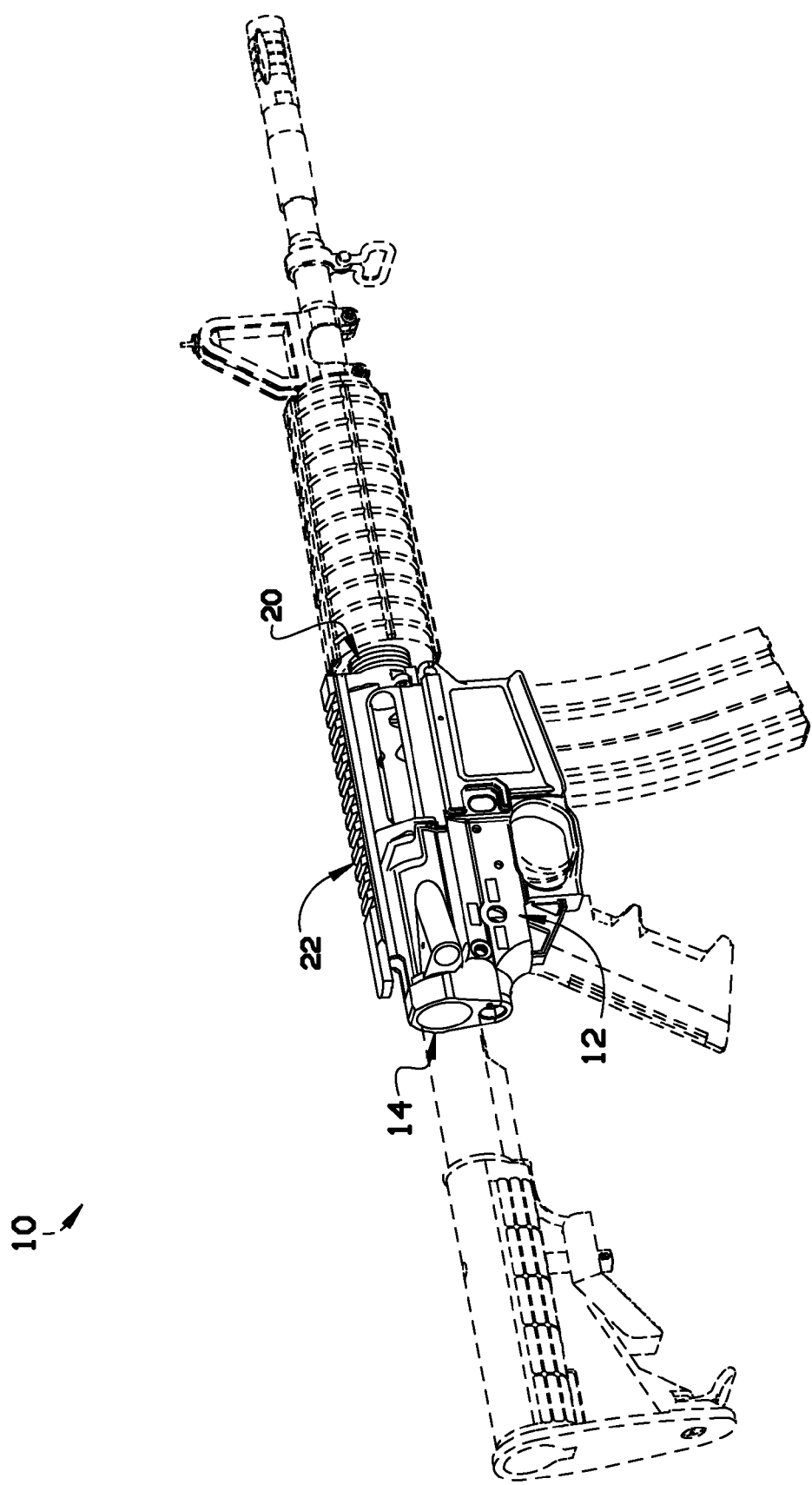
FIG. 1 is a perspective view of an exemplary embodiment of the present invention in use.
Figure 2:
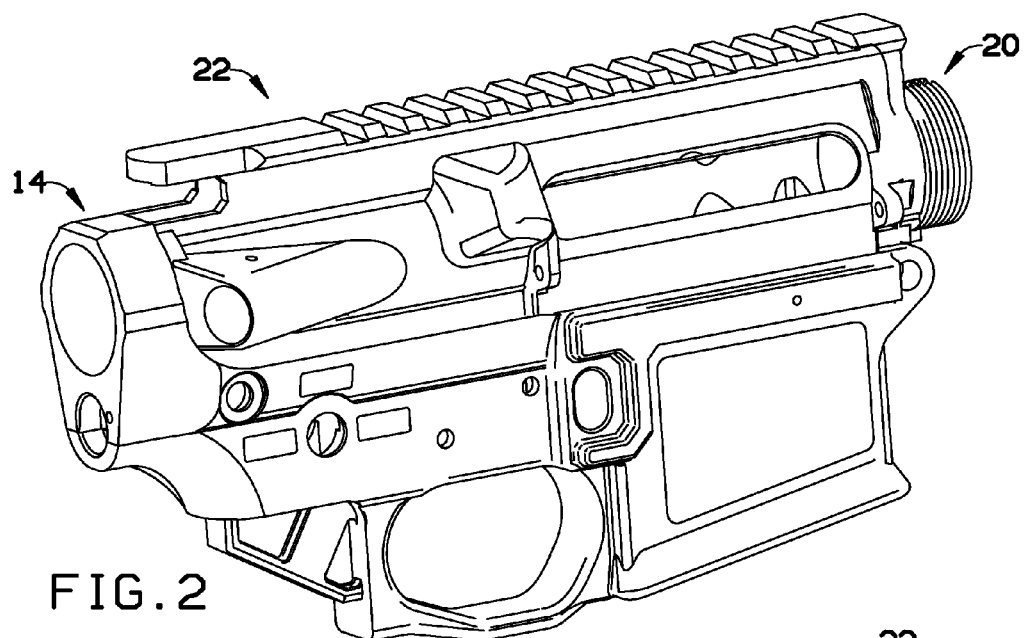
FIG. 2 is a detail perspective view of an exemplary embodiment of the present invention omitting multiple parts for illustrative clarity.
Figure 3:
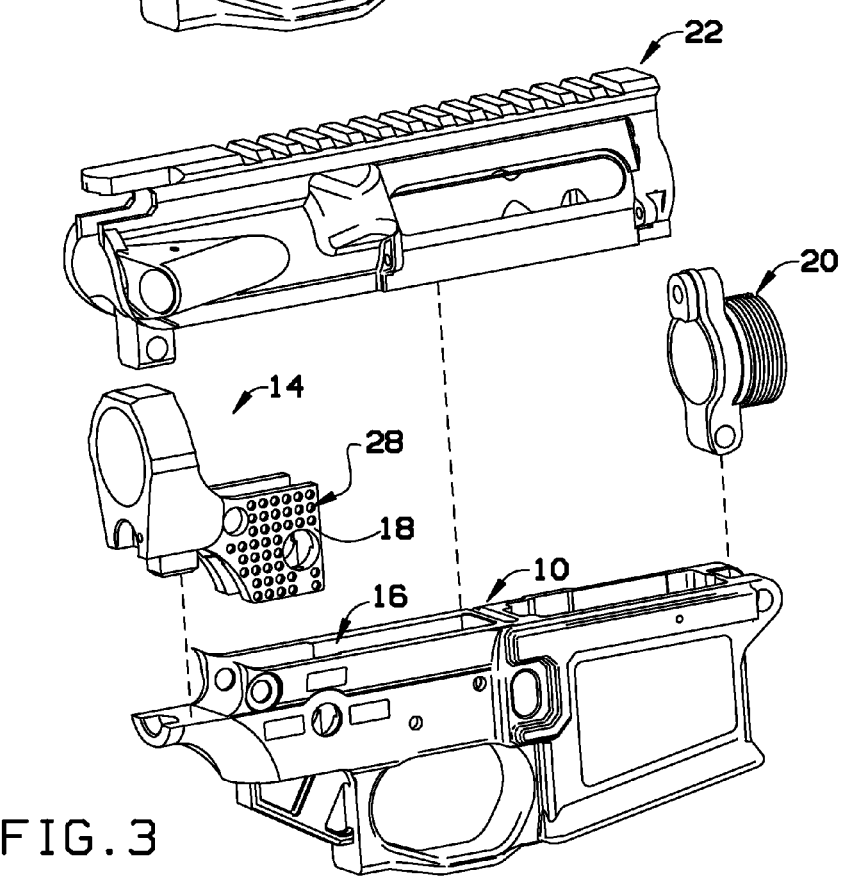
FIG. 3 is an exploded view of an exemplary embodiment of the present invention.
Figure 7:
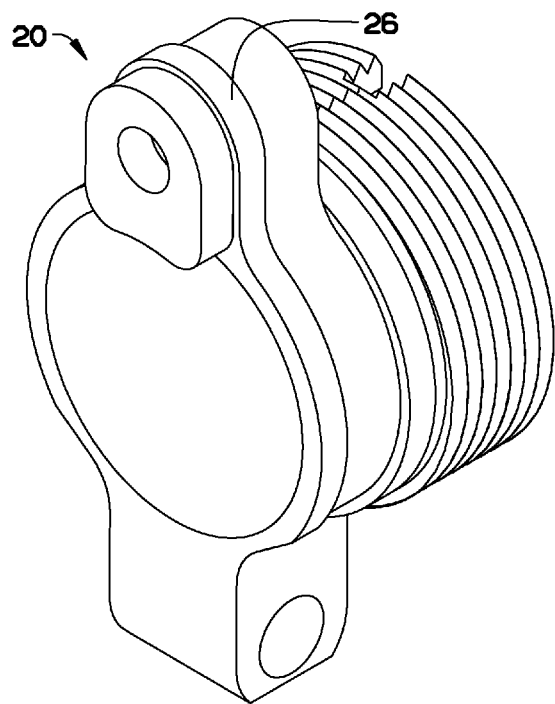
FIG. 7 is a perspective view of a barrel receiver of an exemplary embodiment of the present invention.
Figure 8:
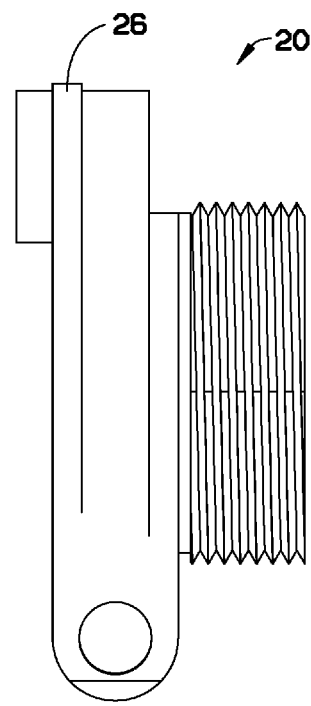
FIG. 8 is a side view of a barrel receiver of an exemplary embodiment of the present invention.
Figure 9:
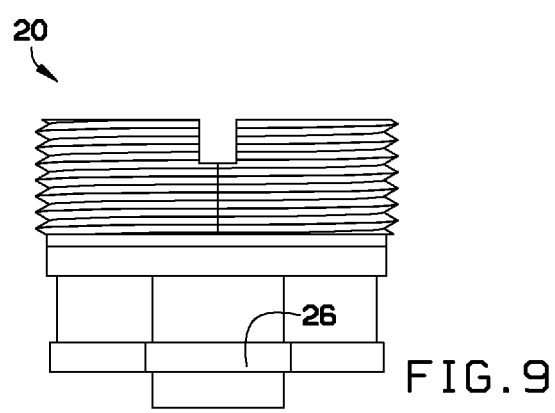
FIG. 9 is a top view of a barrel receiver of an exemplary embodiment of the present invention.

As is illustrated in FIGS. 1 through 9, an exemplary firearm 10 may include a stock/buffer tube mount 14, a polymer/composite receiver 12, a barrel receiver 20 and a polymer/composite upper receiver 22. The stock/buffer tube mount 14 may have a lower portion and may include a stock/buffer tube thread receiver insert joint 18 and a tube mount retainment feature 28. The stock/buffer tube thread receiver insert joint 18 may be attached to the stock/buffer tube mount 14. In certain embodiments, the stock/buffer tube thread receiver insert joint 18 may be attached to the lower portion of the stock/buffer tube mount 14 as is shown in FIGS. 4 through 6. The stock/buffer tube mount 14 may be made from a metal material, a composite material, or a metal/composite material. The stock/buffer tube mount 14 may then become a metal/composite firearm component. The metal material may be aluminum alloys, steel, titanium and the like. The composite material may include, but is not limited to, carbon fiber, Kevlar, fiberglass and the like.

In certain embodiments, at least one metal/composite material with the tube mount retainment feature 28 may be manufactured to the desired shape of the specific at least one firearm component of the specific firearm model. The at least one firearm component may be inserted into a firearm mold. The polymer/composite material may then be injected around the at least one metal/composite component. The specific at least one firearm component may then have the desired and designed strength increase over just a strictly polymer/composite firearm model. The over molded at least one metal/composite component has the designed tube mount retainment feature 28 that may allow plastic to flow into the tube mount retainment feature 28 areas so that the at least one firearm component may be held in place and the desired strength may be achieved. The designed tube mount retainment feature 28 shows a specific style in FIGS. 3 through 5. However, other styles such as undercuts, slots, holes and the like, may be used in a similar manner within the scope of the present invention. A stock/buffer tube over molding area 16 along the exemplary firearm 10 may be where the stock/buffer tube thread receiver insert joint 18 may be over molded. A serial number plate 24 may be disposed along the stock/buffer tube thread receiver insert joint 18.

The barrel receiver 20 may be another part of the firearm that may need additional strength. Similar to the stock/buffer tube mount 14, the barrel receiver 20 may require a barrel receiver retainment feature 26. The barrel receiver 20 may be made from a metal/composite material or the like. The barrel receiver retainment feature 26 may retain the barrel receiver 20 so that polymer/composite material may be injected around the metal/composite part.

Instead of taking material away from the firearm to reduce weight and gain the advantages of plastic properties of polymer/composite firearms, the present process may replace the necessary components altogether with a stronger material, such as a metal material, a composite material or a metal/composite material, that covers a large surface area by having this stronger material added to specific targeted components of the polymer/composite firearm that may cause early failure of the polymer/composite firearm. When the strengthen firearm may be used, the energy of a recoil of the bolt may be spread out along a large surface area across the metal material, composite material or metal/composite material. By spreading out the energy, the at least one firearm component may have an extended life span due to less fatigue.

In certain embodiments, the method of combining the metal/composite material and the polymer/composite material may involve over molding, insert molding, using a retaining feature such as fastener, like in a snap type of fastening and the like, or gluing the metal/composite component to any area of needed strength along the firearm. The present process may be used on an AR-15 as shown in the Figures, but may also be used on any firearm. The present process may be used on receivers, buffer tube mounts and any other part of the firearm that may need strengthening. In alternate embodiments of the invention, the same process may be used for medical devices, over molding cell phone metal bases, electrical bus ways for electrical distribution and the like.

It should be understood, of course, that the foregoing relates to exemplary embodiments of the invention and that modifications may be made without departing from the spirit and scope of the invention as set forth in the following claims.

What is claimed is:

1. A lower receiver comprising:
   a main portion having a forward end for attaching to a barrel receiver, a rear end, and a molding area disposed between the forward end and the rear end; and
   a buffer tube mount disposed at the rear end of the main portion, the buffer tube mount comprising a ring extending up from the main portion and at least one protruding insert joint disposed inside the molding area, wherein:
   the main portion comprises a polymer material;
   the buffer tube mount comprises a high-strength material;
   the at least one protruding insert joint comprises a plurality of retaining features such that polymer material is over molded and injected into the molding area and flows into the plurality of retaining features to permanently hold the buffer tube mount in place with respect to the main portion; and
   the plurality of retaining features are disposed forward of the ring.

2. The lower receiver of claim 1, wherein the plurality of retaining features comprises a plurality of holes extending at least partially through the at least one protruding insert joint.

3. The lower receiver of claim 1, wherein:
   the at least one protruding insert joint comprises a pair of protruding insert joints; and
   each protruding insert joint comprises a plurality of holes arranged in a grid pattern and extending through the full thickness of each of the protruding insert joints.

4. The lower receiver of claim 3, wherein the plurality of holes arranged in a grid pattern cover a majority of a surface of the at least one protruding insert joint.

5. The lower receiver of claim 1, wherein the only attachment between the over molded attachment occurs at the at least one protruding insert joint.

6. The lower receiver of claim 1, wherein the ring does not interface with the injected polymer material.

7. The lower receiver of claim 6, wherein an outer surface of the ring is disposed at an outer surface of the lower receiver.

8. The lower receiver of claim 1, wherein the high-strength material is selected from the group consisting of aluminum, steel, carbon fiber, Kevlar, carbon fiber filled nylon, glass, and Kevlar or carbon fiber filled polyetherimide.

9. A lower receiver comprising:
   a main portion having a forward end for attaching to a barrel receiver, a rear end, and a molding area disposed between the forward end and the rear end; and
   a buffer tube mount disposed at the rear end of the main portion, the buffer tube mount comprising a ring extending up from the main portion and at least one protruding insert joint disposed inside the molding area, wherein:
   the main portion comprises a polymer material;
   the buffer tube mount comprises a high-strength material;
   the at least one protruding insert joint comprises a grid pattern of holes extending at least partially through the at least one protruding insert joint such that polymer material is over molded and injected into the molding area and flows into the holes to hold the buffer tube mount in place with respect to the main portion; and
   the grid pattern of holes is disposed forward of the ring.

10. The lower receiver of claim 9, wherein the grid pattern of holes covers a majority of a surface of the at least one protruding insert joint.

11. The lower receiver of claim 9, wherein:
   the at least one protruding insert joint comprises a pair of protruding insert joints; and
   the holes extend through the full thickness of the protruding insert joints.

12. The lower receiver of claim 9, wherein the only attachment between the over molded attachment occurs at the at least one protruding insert joint.

13. The lower receiver of claim 9, wherein the ring does not interface with the injected polymer material.

14. The lower receiver of claim 13, wherein an outer surface of the ring is disposed at an outer surface of the lower receiver.

15. The lower receiver of claim 9, wherein the high-strength material is selected from the group consisting of aluminum, steel, carbon fiber, Kevlar, carbon fiber filled nylon, glass, and Kevlar or carbon fiber filled polyetherimide.

* * * * *